2,865,780
PREPARATION OF SILICA-SULFITE PIGMENTS

Edward M. Allen, Doylestown, Ohio, assignor to Columbia-Southern Chemical Corporation, a corporation of Delaware No Drawing. Application June 24, 1955
Serial No. 517,935

4 Claims. (Cl. 106—306)

This invention relates to an especially useful type of siliceous pigment which can be prepared by an unusually economical process. It is common knowledge that silica or hydrated silica may be prepared by the reaction of certain salts of silica acid with acids whereby, upon acidification, silica is formed. The types of silica thus prepared must meet rigid requirements for use as reinforcing pigments in rubber and paper compositions. Should the dried silica be too highly agglomerated or insufficiently fine, for instance, it would not meet said requirements.

By following special precautions, it is possible to prepare a finely divided precipitated silica which is useful as a rubber or paper pigment. Such silica which is now on the market has an average ultimate particle size below 0.05 micron. Because of its small particle size, however, recovery of such silica from the aqueous medium in which it is produced is quite expensive since settling and filtration processes are slow and thus a large amount of expensive equipment is necessary, even for a relatively low rate of production.

In accordance with the present invention a novel type of siliceous pigment has been made which not only has excellent properties and is particularly useful in the reinforcement of rubber composition but also settles rapidly and can be filtered readily from aqueous medium. Hence, the pigment herein contemplated can be made at a low cost.

The pigment prepared by the process herein contemplated comprises a finely divided hydrated silica having an average ultimate particle size below 0.1 micron, preferably 0.01 to 0.05 micron, and finely divided alkaline earth metal sulfite having an average ultimate particle size below about 10 microns, preferably in the range of 0.01 to 2 microns. The ultimate particle size stated above may be determined readily by photomicrograph obtained by using the electron microscope. This pigment may be prepared by introducing an alkaline earth metal compound into an aqueous medium containing finely divided precipitated silica and sulphite ions dispersed therein, whereby a silica-alkaline earth metal sulphite pigment is produced.

Preparation of finely divided silica useful for the present invention by the reaction of certain salts of silicic acid with acids must be so governed that the siliceous material resulting is pigmentary in character. A useful pigmentary silica should have an ultimate size of, say, less than 0.1 micron, preferably, 0.01 to 0.05 micron. However, such fine particles settle and/or filter slowly. This inherent difficulty obviously renders the preparation thereof difficult, as set forth above.

Furthermore, it is characteristic of alkaline earth metal sulfites, such as calcium sulfiite, to form agglomerates during drying, that is, the individual particulates tend to cohere and form hard undesirable flocs or agglomerates which do not disperse well in rubber.

The present invention provides a novel method of avoiding the above difficulties and offers a unique and simple process for preparing a very desirable and novel product. Briefly, the instant method involves introducing into an aqueous medium containing finely divided silica and sulfite ions dispersed therein an alkaline earth metal salt, such as calcium chloride, calcium acetate, calcium nitrate, barium chloride, barium acetate, barium nitrate, or the like, and precipitating the corresponding alkaline earth metal sulfite. The alkaline earth metal salt should have a greater solubility in the aqueous medium than its corresponding alkaline earth metal sulfite and the rate and manner of addition of said salt should be controlled. For instance, particularly good results are obtained when, say, calcium chloride is added rapidly to an aqueous medium containing sulfite ions and finely divided silica. To insure rapid intermingling of the reactants, violent agitation of the reactants should be effected at the moment the calcium chloride is introduced.

Thus, an aqueous alkali metal silicate solution, such as sodium silicate, may be reacted with an acid, such as sulfurous acid, and silica precipitated therefrom. An alkali metal salt, such as sodium chloride, may be present in the alkali metal silicate solution to aid precipitation under certain conditions. These conditions are discussed infra. The sulfurous acid may be substituted with its anhydride $SO_2$ or a dilute $SO_2$ mixture of nitrogen and $SO_2$. The resulting silica slurry, while agitating, is then reacted with an alkaline earth metal compound having a greater solubility in said slurry than its corresponding alkaline earth metal sulfite.

More particularly, precipitation of finely divided silica in pigmentary form having a particle size of 0.01 to 0.05 micron and surface areas in the range of 25 to 300 square meters per gram (as determined by the Brunauer-Emmett-Teller method) may be brought about, for instance, by reacting an aqueous sodium silicate solution containing sodium chloride with sulfur dioxide to form an aqueous slurry containing finely divided silica and sulfite ions dispersed therein. Calcium chloride, for instance, may then be added to this slurry to produce the silica-calcium sulfite of the present invention.

Although best results are obtained when sodium chloride is used to aid precipitation, other alkali metal salts may be employed. For example, essentially water soluble alkali metal salts of strong mineral acids, such as sodium sulfate, sodium bromide, sodium nitrate, or trisodium phosphate, or the corresponding potassium or lithium compounds, may be used. When sodium chloride is employed to aid precipitation, it is desirable to use from 5 to 100 grams per liter concentrations thereof. However, where the temperature of reaction is high, for example, above 50° to about 75° C. and the $SiO_2$ content of the solution high, say, above about 50 grams per liter, pigment can be obtained even when no sodium chloride is present.

Typical silica flurries of the type required for this invention are produced according to the methods described in the application of Fred S. Thornhill, Serial No. 308,249, filed September 6, 1954, the disclosure of which is incorporated herein by reference.

To obtain the silica slurry required for this invention by direct precipitation of acid with sodium silicate, it is necessary to conduct the reaction of acid with alkali metal silicate under conditions which must be carefully correlated, as indicated in the Thornhill application. The $SiO_2$ content of the alkali metal silicate must be carefully governed. The concentration of soluble alkali metal salt (such as sodium chloride) in the silicate solution is important, as hereinabove stated, the temperature of reaction, the rate of addition of acid to the solution, etc., are all important. To avoid production of a gel, it is important that the acid be added to the sodium silicate. For instance, when sodium silicate is added to an amount of acid which is less than the stoichiometric amount required to completely neutralize the sodium silicate a gel-type product results.

The rate of acid addition to the sodium silicate solution is of special importance until sufficient acid has been added to neutralize 50 to 70 percent of the $Na_2O$ content of the silicate. Thereafter, the rate becomes less important and the rate of addition can be increased or decreased without significant change in results.

Thus, precipitation of the silica usually begins after about 30 percent of the acid required to react with the $Na_2O$ content of the alkali metal silicate and produce the sodium salt thereof has been added. Precipitation of the silica is essentially complete after 50 to 75 percent of the theoretical amount of acid has been added. Precipitation begins, therefore, when the ratio of $SiO_2$ to $Na_2O$ is about 5, and appears to be substantially completed when the $SiO_2$ to $Na_2O$ ratio is about 10. Neutralization of the residual 30 to 50 percent of $Na_2O$ may be effected at any convenient rate and, in fact, the remainder may be added instantaneously or at any other convenient rate. In general, the rate used is such that the first half of the neutralization to produce a neutral salt (as distinguished from an acid salt) is conducted in 5 to 1440 minutes.

The sodium silicate used normally should have the composition $Na_2O(SiO_2)_x$ where $x$ is at least 2, usually 2 to 4, including fractional numbers, preferably in the range of 3 to 4. The large amount of acid required to neutralize compositions wherein the ratio of $SiO_2$ to $Na_2O$ is less than 2 makes the process economically objectionable. Silicate solutions containing about 10 to 150 grams per liter (preferably not over 100 grams per liter) of $SiO_2$ are generally subjected to acid neutralization. More concentrated solutions usually are unsuitable unless dilute acids are used in which the water of the acids dilutes the reaction mixture to an $SiO_2$ content in this range.

In most cases the amount of acid added should be sufficient to precipitate substantially all or at least a major portion of the silica in the solution and preferably should be enough to largely neutralize the $Na_2O$ content of the silicate, to produce precipitated silica containing less than about 5 percent $Na_2O$, but should not be in excess of that required to produce a silica slurry having a pH below about 6. Even at this slurry pH, the silica has a pH above 7. Where larger amounts of acid are used, the surface area of the silica rises to an undesirable degree.

When the $Na_2O$ concentration of the silica precipitated is not excessively high, this tendency to increase in surface area in an acid medium may be largely eliminated by heating the silica in aqueous medium for a suitable period, usually in excess of 30 minutes. This is particularly true where the silica has been precipitated at a temperature below 60 to 80° C. It is also true where the silica has been precipitated above 80° C. and the acidification time is less than 30 minutes. Preferably, this heating is effected in the mother liquor in which the silica has been precipitated. However, if desired, the silica may be separated from its mother liquor after precipitation and redispersed in pure water, for example. The preferred heat treating temperature is 80 to 100° C. or above, and it is usually advantageous to boil the slurry since this is a simple way of maintaining it at the desired temperature. This treatment is given for a period of at least 30 minutes, preferably 2 to 5 hours, at which time the silica is properly conditioned.

The temperature at which the alkali metal silicate of the present invention is neutralized is dependent upon many factors. Among these factors are the ratio of $Na_2O$ to $SiO_2$, the concentration of $Na_2O$ in the alkali metal silicate solution, the concentration of sodium chloride (should it be present), the rate of addition of acid, etc.

Thus, where an alkali metal silicate solution having an $Na_2O$ to $SiO_2$ ratio of 3.36, an $Na_2O$ concentration of 20.3 grams per liter and a sodium chloride concentration of 20 grams per liter is neutralized with an acid at a rate sufficient to introduce the theoretical amount of acid required to neutralize the $Na_2O$ content of the sodium silicate solution in 4 hours, and the acidification is maintained for 7 hours at a temperature of 25° C., a pigment having a surface area of 127 square meters per gram is produced. Should the identical alkali metal silicate solution, exclusive of the NaCl content, be acidified at a rate sufficient to provide the theoretical amount of acid required to neutralize the $Na_2O$ content in 30 minutes, and should this acidification be continued for 1 hour, the temperature of the reaction would have to be increased to about 90° C. or above in order to realize a pigment having approximately the same surface area.

As stated in the aforementioned Thornhill application, it is necessary to conduct the reaction of acid with sodium silicate under carefully correlated conditions in order to obtain the desired pigmentary silica.

Where silica is precipitated according to processes described in the above-mentioned Thornhill application by use of an acid other than sulfurous acid, such as carbonic acid or $CO_2$, the precipitated silica may be dispersed in a solution of sulfurous acid, or it may be removed from its mother liquor prior to being dispersed in a solution of sulfurous acid, and then treated with an alkaline earth metal compound according to the present invention.

As previously stated, the silica slurry prepared as hereinabove described is vigorously agitated during the addition of the alkaline earth metal compound. For instance, when a calcium chloride solution is employed, it is desirable to introduce it rapidly into a silica slurry undergoing intensive agitation in order to insure proper admixture of the reactants. It is also desirable to introduce a stoichiometric excess of chloride, based on the $Na_2O$ content. An excess of 20 to 30 percent, for instance, yields a particularly good product; however, excesses from about 2 to about 50 percent may be used.

When a calcium chloride solution is employed, it is convenient to use a solution of about 100 grams per liter concentration. Concentrations from about 1 gram per liter to about 700 grams per liter may be employed, however.

Among the desirable properties of the pigment of this invention is its good dispersibility in rubber. The pigment produced by this invention possesses a dispersibility which is superior to the dispersibility of commercial calcium silicate, a pigment which has found wide usage as a rubber reinforcing pigment.

The following are typical standard rubber test recipes used to determine and compare the physical characteristics of rubber products containing the pigment of the present invention:

TABLE I

| | A | B |
|---|---|---|
| | Parts by weight | Parts by weight |
| GR-S-1500 | 75.0 | 25.0 |
| #1 R. S. S | | 55.0 |
| Marbon 8000 (styrene-butadiene resin) | 25.0 | 20.0 |
| Zinc Oxide | 5.0 | 5.0 |
| Sulfur | 3.0 | 2.25 |
| Stearic Acid | 1.0 | 2.0 |
| Santoflex B (reaction product of acetone and p-amino-diphenyl) | | 0.67 |
| Akroflex C (35% diphenyl-p-phenylenediamine, 65% phenyl-alpha-naphthylamine) | 1.0 | |
| Flexamine (65% of a complex diarylamine-ketone reaction product and 35% n,n'-diphenyl-p-phenylenediamine) | | 0.33 |
| Santocure (N-cyclohexyl-2 benzothiazole sulfenamide) | 1.0 | |
| Cumar MH 2½ (polymers of indene, coumarone and associated coal tar compounds) | 5.0 | 5.0 |
| D. O. T. G. (di-ortho-tolyl-guanidine) | 0.25 | 1.2 |
| Altax (Benzothiazyl disulfide) | | 1.0 |
| Red Iron Oxide | | 4.0 |
| Carbowax 4000 (mixture of polyethylene glycols) | | 2.0 |
| Commercial calcium silicate | 90.0 | |
| Product of Example II | | 64.5 |

TABLE II

|  | A | B |
|---|---|---|
|  | Parts by weight | Parts by weight |
| GR-S-1000 | 100.0 | 100.0 |
| Zinc Oxide | 5.0 | 5.0 |
| Sulfur | 2.0 | 3.0 |
| Phenyl-Beta-Naphthylamine | 1.0 | 1.0 |
| Thionex (tetramethyl thiuram monosulfide) | .35 |  |
| Altax (Benzothiazyl disulfide) |  | 1.2 |
| Accelerator 808 (condensation product of butyraldehyde and aniline) | .15 |  |
| Methyl Tuads (Tetramethyl thiuram disulfide) |  | 0.15 |
| Circo Oil | 5.0 |  |
| Cumar MH 2½ (polymers of indene, coumarone and associated coal tar compounds) |  | 15.0 |
| Glycol |  | 3.5 |
| Commercial Calcium Silicate | 66.9 |  |
| Product of Example II |  | 58.5 |

The siliceous pigments prepared according to Examples I, II and III, infra, when tested in the above standard rubber recipes, imparted properties of tensile, tear and flexure to said rubber far superior to those imparted by the commercial calcium silicate. The rubber compounding needs of calcium silicate and the siliceous pigment of the present invention are necessarily different (as witnessed in Tables I and II above) owing to the curing rates of the respective pigments.

The present invention will be more fully understood by reference to the following illustrative examples.

Example I

Eighty-seven gallons of sodium silicate $Na_2O\ (SiO_2)_{3.36}$ was placed in a 100 gallon rubber-lined tank fitted with a mixer. The silicate was adjusted to 20.3 grams per liter $Na_2O$ concentration and 75° C. temperature. Sulfur dioxide gas was bubbled into the bottom of the tank at a rate calculated to furnish a stoichiometric amount in 210 minutes. Initial precipitation of the silica occurred at 58 minutes. At 190 minutes the pH of the slurry was 6.7 and the $SO_2$ addition was stopped. The resulting slurry was then boiled for 1 hour. Into this slurry a calcium chloride solution of 100 grams per liter concentration was dumped rapidly while agitating until 30 percent excess chloride was added based on the equivalent $Na_2O$ content. The pH of the resulting slurry was 2.95. Milk of lime was added to adjust the pH to 7.1, and the resulting mixture was then washed in 2 passes on a small filter wheel and dried in trays in an oven.

Example II

The conditions for this example were the same as those of Example I except that the $SO_2$ addition was stopped when the pH of the slurry reached 9.65. Calcium chloride addition in this slurry resulted in a pH of 9.0. No further adjusting of pH was made. The slurry was then washed and dried as in Example I.

Example III

The conditions for this example were the same as those of Example I except for the $SO_2$ concentration since an $SO_2$-nitrogen mixture was substituted and addition was terminated when the slurry reached a pH of 9.6. Calcium chloride addition to this slurry resulted in a pH of 9.0. No further adjusting of pH was made. The slurry was then washed and dried as in Example I.

The wet filter cake resulting from a washed product slurry of the present invention generally contains 18 to 23 percent solids, although the solids content may be from 8 to 25 percent.

The expression "finely divided precipitated silica" in the instant disclosure is intended to exclude gel-type siliceous particulates.

Although the instant invention has been particularly described as to various embodiments thereof, such embodiments are not to be regarded as limitations upon the scope of the invention, except insofar as the appended claims impose limitations thereon.

I claim:

1. A method of preparing a finely-divided silica-alkaline earth metal sulfite pigment which comprises introducing a water-soluble alkaline earth metal salt into an aqueous medium containing finely-divided, precipitated silica having an average ultimate particle size below 0.1 micron and sulfite ions dispersed therein, said salt having a greater solubility in the aqueous medium than its corresponding alkaline earth metal sulfite, admixture of the reactants being conducted under conditions of agitation, and recovering of the resulting finely-divided silica-alkaline earth metal sulfite pigment.

2. The process of claim 1 wherein the alkaline earth metal salt is calcium chloride and the resulting product is a silica-calcium sulfite pigment.

3. A method of preparing a finely-divided silica-alkaline earth metal sulfite pigment which comprises reacting an aqueous alkali metal silicate solution with sufficient sulfur dioxide to form a slurry containing finely-divided precipitated silica having an average ultimate particle size below 0.1 micron and sulfite ions dispersed therein and having a pH above about 6, said silica comprising at least a major portion of the $SiO_2$ in the silicate solution, reacting the resulting slurry under conditions of agitation with a water-soluble alkaline earth metal salt having a greater solubility in the aqueous medium than its corresponding alkaline earth metal sulfite and recovering of the resulting silica-alkaline earth metal sulfite.

4. The process of claim 3 wherein the alkali metal silicate is sodium silicate, the alkaline earth metal salt is calcium chloride and the resulting product is a silica-calcium sulfite pigment.

References Cited in the file of this patent

UNITED STATES PATENTS

| 1,984,188 | Haywood | Dec. 11, 1934 |
| 2,189,832 | Rafton | Feb. 13, 1940 |
| 2,310,693 | Haywood | Feb. 9, 1943 |
| 2,413,321 | Haywood et al. | Dec. 31, 1946 |
| 2,679,463 | Alexander et al. | May 25, 1954 |
| 2,686,731 | Wainer | Aug. 17, 1954 |
| 2,698,256 | Shea | Dec. 28, 1954 |

FOREIGN PATENTS

| 129,143 | Australia | Dec. 7, 1945 |